United States Patent
Palman et al.

(10) Patent No.: US 11,359,067 B2
(45) Date of Patent: Jun. 14, 2022

(54) GEOPOLYMERIC FOAM COMPRISING TRIPLE-LAYERED STRUCTURE FOR PROTECTING A SUBSTRATE

(71) Applicant: Advanced Insulation Limited, Gloucester (GB)

(72) Inventors: Riccardo Palman, Gloucester (GB); Michael Mallorie, Gloucester (GB); Simon Shepherd, Gloucester (GB)

(73) Assignee: Advanced Innergy Ltd., Gloucester (GB)

( * ) Notice: Subject to any disclaimer, the term of this patent is extended or adjusted under 35 U.S.C. 154(b) by 0 days.

(21) Appl. No.: 16/760,372

(22) PCT Filed: Oct. 24, 2018

(86) PCT No.: PCT/GB2018/053072
§ 371 (c)(1),
(2) Date: Apr. 29, 2020

(87) PCT Pub. No.: WO2019/086838
PCT Pub. Date: May 9, 2019

(65) Prior Publication Data
US 2020/0354540 A1    Nov. 12, 2020

(30) Foreign Application Priority Data

Oct. 31, 2017  (GB) ..................... 1717934

(51) Int. Cl.
| | | |
|---|---|---|
| *C08J 9/35* | (2006.01) | |
| *C08J 9/00* | (2006.01) | |
| *C08J 9/14* | (2006.01) | |

(52) U.S. Cl.
CPC ............... *C08J 9/35* (2013.01); *C08J 9/0061* (2013.01); *C08J 9/0066* (2013.01); *C08J 9/0085* (2013.01); *C08J 9/0095* (2013.01); *C08J 9/142* (2013.01); *C08J 2300/14* (2013.01); *C08J 2363/10* (2013.01)

(58) Field of Classification Search
CPC . C08J 9/35; C08J 9/0061; C08J 9/0066; C08J 9/0085; C08J 9/0095; C08J 9/142; C08J 2300/14; C08J 2363/10; Y02P 40/10; C04B 2111/00482; C04B 2111/0056; C04B 2111/00568; C04B 2111/00612; C04B 2111/28; C04B 38/02
See application file for complete search history.

(56) References Cited

U.S. PATENT DOCUMENTS

| | | | |
|---|---|---|---|
| 6,992,027 B1 | 1/2006 | Buckingham et al. | |
| 2013/0284069 A1* | 10/2013 | Dubey | .............. C04B 22/10 |
| | | | 106/695 |
| 2016/0130811 A1* | 5/2016 | Morsy | ............... B32B 5/22 |
| | | | 428/312.6 |
| 2016/0244366 A1* | 8/2016 | Turcinskas | ........... C04B 28/006 |
| 2016/0265216 A1 | 9/2016 | Monnig et al. | |

FOREIGN PATENT DOCUMENTS

| | | | | |
|---|---|---|---|---|
| EP | 2644583 A1 | 10/2013 | | |
| EP | 3109217 A1 * | 12/2016 | ............ | C04B 28/26 |
| EP | 3109217 A1 | 12/2016 | | |
| FR | 2512805 A1 | 3/1983 | | |
| WO | 2011029444 A1 | 3/2011 | | |
| WO | 2013148843 A2 | 10/2013 | | |
| WO | 2013166603 A1 | 11/2013 | | |
| WO | 2017006102 A1 | 1/2017 | | |
| WO | 2019086838 A1 | 5/2019 | | |

OTHER PUBLICATIONS

Watolla et al., "Intumescent Geopolymer-Bound Coatings for Fire Protection of Steel," Journal of Ceramic Science and Technology, 08 [3] 351-364 (2017). (Year: 2017).*

* cited by examiner

*Primary Examiner* — Kara B Boyle

(57) ABSTRACT

A structure for protecting a substrate. The structure comprises an inner tie coat layer which can bond to the substrate, a geopolymer foam layer, and an outer protective layer. The geopolymer foam layer is the reaction product of a mixture comprising an aluminosilicate source, an alkali activator, reinforcing fibres, and a plurality of microparticles.

20 Claims, No Drawings

GEOPOLYMERIC FOAM COMPRISING TRIPLE-LAYERED STRUCTURE FOR PROTECTING A SUBSTRATE

CROSS-REFERENCE TO RELATED APPLICATIONS

This application is the National Stage of, and therefore claims the benefit of, International Application No. PCT/GB2018/053072 filed on Oct. 24, 2018, entitled "GEOPOLYMERIC FOAM COMPRISING TRIPLE-LAYERED STRUCTURE FOR PROTECTING A SUBSTRATE," which was published in English under International Publication Number WO 2019/086838 on May 9, 2019, which claims priority to GB Application Serial No. 1717934.2 filed Oct. 31, 2017. The above applications are commonly assigned with this National Stage application and are incorporated herein by reference in their entirety.

TECHNOLOGICAL FIELD

Examples of the disclosure relate to a structure for protecting a substrate, and particularly a structure for protecting a substrate from extreme temperatures.

BACKGROUND

Liquefied natural gas (LNG) is natural gas, which generally has a methane content between 85% to 99%, and a weight of between 430-480 kg/m$^3$, that has been condensed to a liquid form by cooling to approximately −162° C. at atmospheric pressure. LNG has a significantly reduced volume compared to natural gas, for example, with 600 m$^3$ of natural gas being condensed to 1 m$^3$ of LNG. Accordingly, Natural gas is often stored and transported as LNG. LNG is stored in cryogenic storage tanks, and transported in cryogenic carriers, such as sea vessels and road tankers.

In the event of a leak or spillage, LNG vaporizes rapidly turning into a gas and mixing with air. The resulting flammable mixture may ignite in the presence of an ignition source creating an LNG fire. In the event of a leak or spillage and subsequent LNG fire, a substrate contacted by LNG is subjected to extreme temperatures from −162° C. on initial contact up to 1350° C. on exposure to an LNG fire.

Substrates which could be exposed to LNG in the event of a leak or spillage include, for example, the decks of sea vessels transporting LNG and flooring at storage facilities and wharfs. Such substrates are often steel or concrete.

It is known that steel and concrete substrates are damaged by exposure to extreme temperatures. Accordingly, there is a requirement to protect substrates which may be exposed to LNG and a subsequent LNG fire from extreme temperatures which may range from −162° C. to 1350° C.

All proportions referred to in this specification are indicated as weight % of the total composition.

BRIEF SUMMARY

According to various, but not necessarily all, examples of the disclosure there is provided a structure for protecting a substrate, the structure comprising an inner tie coat layer which can bond to the substrate, a geopolymer foam layer, and an outer protective layer; the geopolymer foam layer being the reaction product of a mixture comprising an aluminosilicate source, an alkali activator, reinforcing fibres, and a plurality of microparticles.

The aluminosilicate source may comprise any of: class F Fly Ash, weathered rock where kaolinization is far advanced, calcined clays, aluminium containing silica fume, ground granulated slags, or partially calcined clays. The partially calcined clays may comprise metakaolin. The mixture may comprise 20 to 45 weight % of aluminosilicate source, and may comprise 30 to 40 weight % of aluminosilicate source, and may comprise 32 to 39 weight % of aluminosilicate source.

The alkali activator may comprise a mixture of alkali metal hydroxide and silicate. The alkali metal hydroxide may comprise potassium hydroxide. The silicate may comprise potassium silicate. The mixture may comprise 10 to 35 weight % of alkali activator, and may comprise 20 to 30 weight % of alkali activator, and may comprise 23 to 28 weight % of alkali activator.

The reinforcing fibres may comprise any of: basalt fibres, ceramic fibres, glass fibres, glass flake, natural fibres, polypropylene fibres, thermoplastic fibres, or polyvinyl alcohol (PVA) fibres. The thermoplastic fibres may comprise copolymers, and may comprise Nylon and polyether ether ketone. The natural fibres may comprise cellulose fibres. The ceramic fibres may comprise silicon carbide fibres and carbon fibres. The mixture may comprise 0.5 to 2 weight % reinforcing fibres, and may comprise 0.7 to 1.5 weight % reinforcing fibres, may comprise 0.9 to 1.1 weight % reinforcing fibres.

The microparticles may comprise any of: glass, thermoplastic copolymers of polyacrylonitrile, a phenolic material, a refractory material, a ceramic material, or steel. The microparticles may comprise microspheres. The microspheres may comprise any of: glass, thermoplastic copolymers of polyacrylonitrile, a phenolic material, a refractory material, a ceramic material, or steel. The mixture may comprise 20 to 50 weight % of microparticles, and may comprise 25 to 45 weight % of microparticles, and may comprise 28 to 43 weight % of microparticles. The microparticles may have an average diameter in the range of 30 to 200 microns.

The microparticles may comprise hollow microparticles, or may comprise solid microparticles. The microspheres may comprise hollow microspheres, or may comprise solid microspheres.

The mixture may comprise lightweight beads, which may be foamed beads. The lightweight beads may comprise polymeric beads, such as expanded polypropylene and/or foamed inorganic beads, such as expanded glass or expanded clay.

The mixture may comprise water a soluble polymer, which may comprise any of: methyl cellulose, (poly)vinyl acetate, (poly)methyl methacrylate, (poly)vinyl alcohol, vinyl esters, or mixtures thereof.

The mixture may comprise a foaming agent. The foaming agent may comprise any of: a surfactant, a sulphonate, a protein, or a blowing agent. The sulphonate may comprise any of: sodium lauryl ether sulfate, sodium dodecyl sulphate, or ammonium lauryl sulphate. The blowing agent may comprise any of: aluminium powder, baking powder, azodicarbonamide, titanium hydride, or isocyanates. The mixture may comprise 0.05 to 1 weight % foaming agent, and may comprise 0.1 to 0.8 weight % foaming agent, and may comprise 0.2 to 0.5 weight % foaming agent.

The mixture may comprise a water repellent. The water repellent may comprise any of: a silicone material, epoxy resin, or hydrophobic powders. The mixture may comprise 0.01 to 10 weight % of water repellent, and may comprise 0.01 to 5 weight % of water repellent, and may comprise 0.01 to 4 weight % of water repellent.

The mixture may comprise water. The mixture may comprise 2 to 15 weight % of water, and may comprise 5 to 10 weight % of water repellent, and may comprise 6 to 8 weight % of water.

The geopolymer foam layer may comprise a support material. The support material may comprise a mesh, and may comprise rods, and may comprise mesh and rods. The rods may comprise basalt or steel. The geopolymer foam layer may comprise a plurality of spaced apart support materials. The support material may comprise any of: stainless steel mesh, natural fibre mesh, glass mesh, carbon fibre mesh, Kevlar mesh, basalt mesh, or plastic mesh.

Alternatively, the geopolymer foam layer may not comprise a support material.

The geopolymer foam layer may be rigid.

The geopolymer foam layer may have a thickness of about 15 to 300 mm, and may have a thickness of about 15 to 60 mm.

The inner tie coat may comprise an epoxy resin composition. The inner tie coat may be the reaction product of a mixture comprising an epoxy resin and a curing agent. The curing agent may be an amine, and may be an aliphatic polyamine, which may be isophoronediamine. The epoxy resin may be Bis-A epoxy resin or Bis-F epoxy resin. The mixture may comprise a filler. The filler may be aluminium tri-hydrate or metakaolin. The mixture may comprise a coupling agent, which may comprise Gamma-chloropropyltrimethoxysilane.

The mixture may comprise 60 to 90 weight % of epoxy resin, and may comprise 65 to 85 weight % of epoxy resin, and may comprise 70 to 80 weight % of epoxy resin. The mixture may comprise 10 to 25 weight % of curing agent, and may comprise 12 to 20 weight % of curing agent, and may comprise 15 to 18 weight % of curing agent. The mixture may comprise 2 to 10 weight % of filler, and may comprise 4 to 8 weight % of filler, and may comprise 5 to 7 weight % of filler.

Alternatively, the inner tie coat may comprise any of: styrene butadiene rubber, acrylic reins and adhesives, silyl-modified polyether, or polyvinyl acetate.

The inner tie coat layer may comprise a support material. The support material may comprise a mesh, and may comprise rods, and may comprise mesh and rods. The rods may comprise basalt or steel. The support material may comprise any of: stainless steel mesh, natural fibre mesh, glass mesh, carbon fibre mesh, Kevlar mesh, basalt mesh or plastic mesh.

Alternatively, the inner tie coat layer may not comprise a support material

The support material of the tie coat layer may be different from the support material of the geopolymer foam layer. Alternatively, the support material of the tie coat layer may be the same as the support material of the geopolymer foam layer.

The outer protective layer may be the reaction product of a mixture comprising an epoxy resin and a curing agent. The mixture may also comprise a reinforcing cloth. The reinforcing cloth may be chopped strands mat. The chopped strands mat may be laminated with epoxy resin. The ratio of chopped strands mat to epoxy resin may be 1:1 to 1:7, and may be 1:3 to 1:6, and may be 1:5.

The curing agent may be an amine, and may be an aliphatic polyamine, which may be isophoronediamine. The epoxy resin may be Bis-A epoxy resin. The mixture may comprise a filler. The filler may be aluminium tri-hydrate.

The mixture may comprise a reactive diluent, which may be Epoxy functional glycidyl ether. The mixture may comprise a fire retardant, which may be triethyl phosphate.

The mixture may comprise 10 to 30 weight % of epoxy resin, and may comprise 15 to 25 weight % of epoxy resin, and may comprise 17 to 21 weight % of epoxy resin. The mixture may comprise 3 to 12 weight % of curing agent, and may comprise 4 to 10 weight % of curing agent, and may comprise 5 to 8 weight % of curing agent.

The mixture may comprise 50 to 75 weight % of filler, and may comprise 55 to 70 weight % of filler, and may comprise 60 to 65 weight % of filler.

The mixture may comprise 3 to 12 weight % of reactive diluent, and may comprise 4 to 10 weight % of reactive diluent, and may comprise 5 to 8 weight % of reactive diluent.

The mixture may comprise 0.5 to 7 weight % of fire retardant, and may comprise 1 to 5 weight % of fire retardant, and may comprise 2 to 4 weight % of fire retardant.

The outer protective layer may comprise any of: glass, basalt, carbon fibres, aramid, woven cloth, non-woven cloth, polyurethane, polyester, or geopolymer foam material.

Alternatively, the outer protective layer may be the reaction product of a mixture comprising an aluminosilicate source and an alkali activator.

The structure may comprise a tile. The tile may be provided on the outer protective layer. The tile may comprise any of: polyester, phenolic material, melamine, or geopolymer foam material.

According to various, but not necessarily all, examples of the disclosure there is provided a method of applying a structure to a substrate, the method comprising:

applying an inner tie coat layer to the substrate;

applying a geopolymer foam layer to the inner tie coat layer, the geopolymer foam layer being the reaction product of a mixture comprising an aluminosilicate source, an alkali activator, reinforcing fibres, and a plurality of microparticles; applying an outer protective layer to the geopolymer foam layer.

According to various, but not necessarily all, examples of the disclosure there may be provided examples as claimed in the appended claims.

BRIEF DESCRIPTION

For a better understanding of various examples that are useful for understanding the detailed description, reference will now be made by way of example only.

DETAILED DESCRIPTION

Examples of the disclosure relate to a structure for a protecting substrate, and to a method of applying a structure to a substrate. The substrate may have a concrete or steel surface, and may be the deck of a sea vessel transporting LNG, or flooring at a storage facility or wharf.

Example Structures

In a first example of the disclosure, the structure comprises an inner tie coat layer which can bond to a substrate, a geopolymer foam layer, and an outer protective layer. The geopolymer foam layer is provided between the inner tie coat layer and the outer protective layer. The geopolymer foam layer is the reaction product of a mixture comprising an aluminosilicate source, an alkali activator, reinforcing fibres, and a plurality of microparticles.

The inner tie coat layer increases adhesion between the geopolymer foam layer and the substrate. The outer protective layer provides a moisture barrier, improves impact and abrasion resistance, and increases the overall strength of the structure.

In a second example of the disclosure, the structure is the same as the first example but with the following differences. The inner tie coat layer comprises a support material in the form of a mesh. The mesh extends in a plane through the inner tie coat layer.

The geopolymer foam layer is provided on the inner tie coat layer. The support material in the form of a mesh in the inner tie coat layer increases adhesion to the geopolymer foam layer, and provides reinforcement.

The geopolymer foam layer comprises two spaced apart support materials in the form of a first mesh spaced from a second mesh. Each respective mesh of the geopolymer foam layer extends in a plane through the layer. The first mesh is provided substantially at a midpoint in the geopolymer foam layer, and the second mesh is provided toward the top of the geopolymer foam layer, which in use is a side of the geopolymer foam layer farthest from the inner tie coat layer. The support materials in the form of the first mesh and the second mesh increase the mechanical strength of the geopolymer foam layer. The second mesh also provides a flat and course surface on which to apply the outer protective layer.

In the second example, a tile is provided on the outer protective layer and therefore forms the visible surface of the structure. The tile provides a moisture barrier, improves impact and abrasion resistance, and can provide a required aesthetic finish.

In a third example of the disclosure, the structure is the same as the second example, except that a tile is not provided. Accordingly, in the third example the outer protective layer forms the visible surface of the structure.

In a fourth example of the disclosure, the structure is the same as the second example, except that the inner tie coat layer does not comprise a support material.

In a fifth example of the disclosure, the structure is the same as the second example, except that the geopolymer foam layer comprises a single support material in the form of a mesh which is provided substantially at a midpoint in the geopolymer foam layer.

In a sixth example of the disclosure, the structure is the same as the second example, except that the geopolymer foam layer comprises a single support material in the form of a mesh which is provided toward the top of the geopolymer foam layer, which in use is a side of the geopolymer foam layer farthest from the inner tie coat layer.

The mesh could be provided at any position in the geopolymer foam layer.

In a seventh example of the disclosure, the structure is the same as the second example, except that the geopolymer foam layer does not comprise a support material.

Example mixtures for providing an inner tie coat layer, a geopolymer foam layer, and an outer protective layer according to the disclosure are provided in the tables below.

Example Mixtures for Providing a Geopolymer Foam Layer

| Component | Specific example of component | Specific example 1 (wt %) | Specific example 2 (wt %) | Specific example 3 (wt/%) |
| --- | --- | --- | --- | --- |
| Aluminosilicate source | metakaolin | 33.44 | 28.37 | 39.32 |
| Alkali activator | Mixture of potassium hydroxide & potassium silicate | 24.21 | 20.55 | 28.47 |
| Reinforcing fibres | Basalt fibres | 1.00 | 1.00 | 1.00 |
| Hollow microspheres | Hollow ceramic microspheres | 29.13 | 42.59 | 20.34 |
| Foaming agent | sulphonate | 0.24 | 0.48 | None |
| Water repellent | silicone material | 4.00 | 0.01 | None |
| Water | Tap water | 7.98 | 7.00 | 11.86 |

In some examples, such as indicated in the table above, the microparticles are microspheres, and in particular hollow ceramic microspheres, which are lightweight fillers. Microparticles, for example microspheres, such as hollow ceramic microspheres prevent cracking, reduce shrinkage, enhance passive fire resistance and improve insulation. Hollow microspheres may be cenospheres. Microparticles, such as microspheres, are low density beads, which may be hollow or solid.

Reinforcing fibres, such as basalt fibres, provide structural reinforcement, increase impact resistance, increase resiliency of material and provide slump control.

Foaming agents reduce viscosity, improve dispersion of components, reduce density and improve processing.

Water repellents reduce water absorption.

The geopolymer foam layer has a density of about 80 to 800 Kilograms per cubic meter, and may have a density of about 750 Kilograms per cubic meter. The geopolymer foam layer weighs about 300 to 1000 kilograms per cubic meter. The compressive strength of the geopolymer foam layer is about 8 megapascals.

In some examples, the mixture comprises lightweight beads. The lightweight beads may comprise polymeric beads such as expanded polypropylene and/or lightweight inorganic beads such as expanded glass or expanded clay. The mixture may comprise about 2.5 weight percent of the lightweight beads. The lightweight beads may be foamed beads. The lightweight beads may be expanded materials, and may comprise voids. The resulting geopolymer foam layer formed from a mixture comprising lightweight beads has a reduced weight.

In some examples, the mixture comprises a water soluble polymer such as methyl cellulose, (poly)vinyl acetate, (poly)methyl methacrylate, (poly)vinyl alcohol, vinyl esters, or mixtures thereof. The mixture may comprise about 5 weight percent of the water soluble polymer. The resulting geopolymer foam layer formed from a mixture comprising a water soluble polymer has improved tensile strength and impact resistance.

Example Mixture for Providing an Inner Tie Coat Layer

| Component | Specific example of component | Specific example 1 (wt %) | Specific example 2 (wt %) |
| --- | --- | --- | --- |
| epoxy resin | Bis-A epoxy resin | 76.42 | None |
| | Bis-F epoxy resin | None | 51.65 |
| curing agent | Isophoronediamine | 17.92 | None |
| | Ancamide 3444 | None | 30.99 |
| Filler | Aluminium tri-hydrate | 5.66 | None |

-continued

| Component | Specific example of component | Specific example 1 (wt %) | Specific example 2 (wt %) |
|---|---|---|---|
| | Metakaolin | None | 16.53 |
| Coupling agent | Gamma-chloropropyltrimethoxysilane | None | 0.83 |

Ancamide 3444™ is a mixture of different amines.

Example Mixture for Providing an Outer Protective Layer

| Component | Specific example of component | Specific example 1 (wt %) | Specific example 2 (wt %) |
|---|---|---|---|
| epoxy resin | Bis-A epoxy resin | 19.16 | None |
| Aluminosilicate source | Metakaolin | None | 40.50 |
| curing agent | isophoronediamine | 6.73 | None |
| Alkali activator | Mixture of potassium hydroxide and potassium silicate | None | 29.34 |
| Reactive diluent | Epoxy functional glycidyl ethers | 6.47 | None |
| Fire retardant | Triethyl phosphate (TEP) | 2.92 | None |
| Water | Water | None | 12.56 |
| Filler | aluminium tri-hydrate | 64.72 | 17.46 |
| Foaming agent | sulphonate | None | 0.14 |
| Reinforcing cloth | Chopped strands mat | 5:1 resin/glass cloth in weight | 5:1 resin/glass cloth in weight |

Example Method of Applying a Structure to a Substrate

Examples of the disclosure also provide a method of applying a structure to a substrate.

In a first example of the disclosure, the method comprises in a first step, applying an inner tie coat layer to the substrate; in a second step, applying a geopolymer foam layer to the inner tie coat layer; and in a third step, applying an outer protective layer to the geopolymer foam layer.

The components of the geopolymer foam layer, which may be, for example, the components listed in any of the examples provided in the table above, are mixed to form a mixture prior to application of the mixture to the inner tie coat layer to form the geopolymer foam layer upon curing. Accordingly, in such examples a wet mixture is applied to the inner tie coat layer. As the mixture is at least partially syntactic and foamed, the components are mixed until a required volume (and hence density) is achieved. The Reinforcing fibres are the final components added to the mixture. The mixture may be mechanically mixed.

The mixture is poured onto the inner tie coat layer.

Although water is added to the reaction mixture, it is thought to evaporate once the mixture has cured. The reaction mixture may comprise 5 to 10% by weight of water. Water reduces system viscosity, improves dispersion of components and improves processing.

In a second example of the disclosure, the method is the same as the first example but in this case a support material in the form of a mesh is applied to the inner tie coat layer, and may be applied before the inner tie coat layer has cured such that it at least partially sinks into the uncured mixture which once cured forms the inner tie coat layer.

Furthermore, two spaced apart support materials in the form of a first mesh and a second mesh are provided in the geopolymer foam layer. The first mesh may be provided substantially at a midpoint in the geopolymer foam layer. In practice, the first mesh is applied after half the mixture which forms the geopolymer foam layer upon curing has been applied. The second half of the mixture is then applied on top of the mesh, such that the mesh is located substantially at a midpoint in the geopolymer foam layer. The mixture is sufficiently viscous for the mesh to be held in position during this process. The second mesh is provided toward or at the top of the geopolymer foam layer. In practice, after all the mixture which forms the geopolymer foam layer has been applied, the second mesh is applied on top of the mixture before the mixture has cured.

In some examples, a tile may optionally be applied to the outer protective layer.

There is thus described a structure for protecting a substrate, and particularly a structure for protecting a substrate from extreme temperatures, with a number of advantages as detailed above, and as follows.

Examples according to the present disclosure provide a structure for a substrate which can protect the substrate from the extreme temperatures associated with an LNG leak or spillage and subsequent LNG fire.

Furthermore, the geopolymer foam layer is significantly lighter than, for instance, concrete. The geopolymer foam layer has a high compressive strength, and is not therefore damaged, for instance, by driving heavy equipment over the structure. The geopolymer foam layer comprises only inorganic materials which are harmless and non-combustible. The geopolymer foam layer is free of phenyls and formaldehydes which are harmful.

Although embodiments of the present invention have been described in the preceding paragraphs with reference to various examples, it should be appreciated that modifications to the examples given can be made without departing from the scope of the invention as claimed. For example, the outer protective layer could be provided by surface treating the geopolymer foam layer to provide a nonporous moisture resistant surface. For example, the geopolymer foam layer may be preformed as a tile, and the tile applied to the inner tie coat layer.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term "example" or "for example" or "may" in the text denotes, whether explicitly stated or not, that such features or functions are present in at least the described example, whether described as an example or not, and that they can be, but are not necessarily, present in some of or all other examples. Thus "example", "for example" or "may" refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I/we claim:

What is claimed is:

1. A structure for protecting a substrate, the structure comprising:
    an inner tie coat layer which can bond to the substrate, a geopolymer foam layer, and an outer protective layer;
    wherein the geopolymer foam layer is the reaction product of a mixture comprising an aluminosilicate source, an alkali activator, reinforcing fibres, a plurality of microparticles, and water, wherein the mixture comprises 20 to 50 weight % of the plurality of microparticles; and
    wherein the inner tie coat layer comprises an epoxy resin.

2. A structure according to claim 1, wherein the mixture comprises 20 to 45 weight % of the aluminosilicate source and 10 to 35 weight % of the alkali activator.

3. A structure according to claim 1, wherein the mixture comprises 0.5 to 2 weight % of the reinforcing fibres.

4. A structure according to claim 1, wherein the mixture comprises a water soluble polymer, wherein the water soluble polymer comprises any of: methyl cellulose, (poly)vinyl acetate, (poly)methyl methacrylate, (poly)vinyl alcohol, or vinyl esters.

5. A structure according to claim 1, wherein the mixture comprises a foaming agent and wherein the foaming agent comprises a sulphonate.

6. A structure according to claim 5, wherein the mixture comprises 0.05 to 1 weight % of the foaming agent.

7. A structure according to claim 1, wherein the mixture comprises a water repellent, and wherein the mixture comprises 0.01 to 10 weight % of the water repellent.

8. A structure according to claim 1, wherein the mixture comprises 2 to 15 weight % of water.

9. A structure according to claim 1, wherein the geopolymer foam layer comprises a support material.

10. A structure according to claim 9, wherein the support material comprises a plurality of spaced apart support materials.

11. A structure according to claim 9, wherein the support material comprises a mesh extending in a plane through the geopolymer foam layer.

12. A structure according to claim 11, wherein the mesh comprises any of: stainless steel mesh, natural fibre mesh, glass mesh, carbon fibre mesh, poly-para-phenylene terephthalamide mesh, basalt mesh, or plastic mesh.

13. A structure according to claim 9, wherein the support material comprises rods, and the rods comprise basalt or steel.

14. A structure according to claim 1, wherein the inner tie coat layer comprises a support material, the support material comprising a mesh or rods.

15. A structure according to claim 1, wherein the outer protective layer comprises woven cloth or non-woven cloth.

16. A method of applying a structure to a substrate, the method comprising:
    applying an inner tie coat layer to the substrate, wherein the inner tie coat layer comprises an epoxy resin;
    applying a geopolymer foam layer to the inner tie coat layer, the geopolymer foam layer being the reaction product of a mixture comprising an aluminosilicate source, an alkali activator, reinforcing fibres, a plurality of microparticles, and water, wherein the mixture comprises 20 to 50 weight % of the plurality of microparticles; and
    applying an outer protective layer to the geopolymer foam layer.

17. A method according to claim 16, wherein the mixture is applied to the inner tie coat layer as a wet mixture, and the mixture forms the geopolymer foam layer upon curing.

18. A structure according to claim 1, wherein the inner tie coat layer is the reaction product of a mixture comprising the epoxy resin and an amine curing agent.

19. A structure according to claim 1, wherein the inner tie coat layer comprises 60 to 90 weight % of epoxy resin.

20. A structure for protecting a substrate, the structure comprising:
    an inner tie coat layer which can bond to the substrate, a geopolymer foam layer, and an outer protective layer;
    wherein the geopolymer foam layer is the reaction product of a mixture comprising an aluminosilicate source, an alkali activator, reinforcing fibres, a plurality of microparticles; and
    wherein the inner tie coat layer comprises an epoxy resin.

* * * * *